United States Patent
Joko

(10) Patent No.: US 9,678,491 B2
(45) Date of Patent: Jun. 13, 2017

(54) ENERGY MANAGEMENT SYSTEM, GAS METER, AND ENERGY MANAGEMENT APPARATUS

(71) Applicant: KYOCERA CORPORATION, Kyoto (JP)

(72) Inventor: Shingo Joko, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 579 days.

(21) Appl. No.: 14/348,032

(22) PCT Filed: Sep. 28, 2012

(86) PCT No.: PCT/JP2012/075249
§ 371 (c)(1),
(2) Date: Mar. 27, 2014

(87) PCT Pub. No.: WO2013/047841
PCT Pub. Date: Apr. 4, 2013

(65) Prior Publication Data
US 2014/0236378 A1 Aug. 21, 2014

(30) Foreign Application Priority Data

Sep. 28, 2011 (JP) ................................. 2011-213582

(51) Int. Cl.
*G05D 3/12* (2006.01)
*G05B 15/02* (2006.01)
(Continued)

(52) U.S. Cl.
CPC .............. *G05B 15/02* (2013.01); *F17D 5/02* (2013.01); *G01F 1/00* (2013.01); *G01F 3/22* (2013.01);
(Continued)

(58) Field of Classification Search
None
See application file for complete search history.

(56) References Cited

U.S. PATENT DOCUMENTS 4,565,090 A * 1/1986 Gotanda ................... G01F 3/22
340/606
4,706,881 A * 11/1987 Ballard ................... F23N 1/022
236/10

(Continued)

FOREIGN PATENT DOCUMENTS

EP         2 509 144 A1      10/2012
JP         01-020369 B2      4/1989
(Continued)

OTHER PUBLICATIONS

Extended European Search Report dated Dec. 11, 2015 issued by the European Patent Office for Counterpart European Application No. 128349.6-1360.

(Continued)

*Primary Examiner* — Adam Lee
(74) *Attorney, Agent, or Firm* — Procopio Cory Hargreaves and Savitch LLP

(57) ABSTRACT

An energy management system 1 is provided with an SOFC unit 100 and a gas meter 200. The gas meter 200 includes: a control unit 230 that stops gas supply when continuous use of gas lasts a specific period; and a transmission unit 220 that transmits a stop instruction signal to the SOFC unit 100 before a timing at which continuous use of gas lasts the specific period, the stop instruction signal designating a time limit that is before the timing and instructing to stop the SOFC unit 100.

9 Claims, 4 Drawing Sheets

(51) Int. Cl.
  *F17D 5/02* (2006.01)
  *G01F 1/00* (2006.01)
  *G01F 3/22* (2006.01)
  *G01F 15/00* (2006.01)
  *H01M 8/04955* (2016.01)
  *G01F 13/00* (2006.01)
  *H01M 8/04746* (2016.01)
  *H01M 8/124* (2016.01)

(52) U.S. Cl.
  CPC .......... *G01F 13/006* (2013.01); *G01F 15/002* (2013.01); *H01M 8/04753* (2013.01); *H01M 8/04955* (2013.01); *H01M 2008/1293* (2013.01)

(56) References Cited

U.S. PATENT DOCUMENTS

| | | | | |
|---|---|---|---|---|
| 4,787,410 A * | 11/1988 | Fujieda | F23N 5/242 | 137/554 |
| 4,839,790 A * | 6/1989 | Fujimoto | F16K 17/20 | 48/194 |
| 4,866,633 A * | 9/1989 | Nakane | F23N 5/184 | 137/624.11 |
| 8,577,511 B2 * | 11/2013 | Ohara | F24D 19/1048 | 700/286 |
| 8,577,512 B2 * | 11/2013 | Kaneko | F24D 19/1048 | 700/286 |
| 2004/0229098 A1 * | 11/2004 | Fujita | H01M 8/04164 | 429/414 |
| 2005/0074644 A1 * | 4/2005 | Ueda | H01M 8/04089 | 429/423 |
| 2006/0088742 A1 * | 4/2006 | Kotani | H01M 8/04104 | 429/446 |
| 2006/0115699 A1 * | 6/2006 | Matsuoka | H01M 8/04007 | 429/414 |
| 2007/0231637 A1 * | 10/2007 | Shibata | H01M 8/04223 | 429/429 |
| 2008/0026268 A1 * | 1/2008 | Zeng | B60L 1/02 | 429/429 |
| 2009/0013765 A1 * | 1/2009 | Nakano | F17D 5/02 | 73/40.5 R |
| 2009/0018782 A1 * | 1/2009 | Sameda | G01F 9/008 | 702/45 |
| 2010/0129692 A1 * | 5/2010 | Ueda | H01M 8/04753 | 429/431 |
| 2010/0304235 A1 * | 12/2010 | Shigezumi | C01B 3/384 | 429/416 |
| 2010/0330515 A1 * | 12/2010 | Ueki | F23N 5/242 | 431/22 |
| 2011/0008687 A1 * | 1/2011 | Ballantine | G01M 3/28 | 429/410 |
| 2011/0259446 A1 * | 10/2011 | Ueki | F23K 5/005 | 137/487.5 |
| 2011/0314893 A1 * | 12/2011 | Masui | G01N 27/4067 | 73/1.06 |
| 2011/0318659 A1 * | 12/2011 | Tatsui | H01M 8/04223 | 429/423 |
| 2012/0040256 A1 * | 2/2012 | Kani | C01B 3/384 | 429/410 |
| 2012/0237840 A1 * | 9/2012 | Morita | H01M 8/04664 | 429/413 |

FOREIGN PATENT DOCUMENTS

| | | |
|---|---|---|
| JP | 2001-255192 A | 9/2001 |
| JP | 2002-267568 A | 9/2002 |
| JP | 2004-185917 A | 7/2004 |
| JP | 2004-258767 A | 9/2004 |
| JP | 2005-346986 A | 12/2005 |
| JP | 2005-353292 A | 12/2005 |
| JP | 2006-053073 A | 2/2006 |
| JP | 2011-175816 A | 9/2011 |
| JP | 2011-210449 A | 10/2011 |
| WO | 2011/067923 A1 | 9/2011 |

OTHER PUBLICATIONS

International Search Report; PCT/JP2012/075249; Nov. 13, 2012.

* cited by examiner

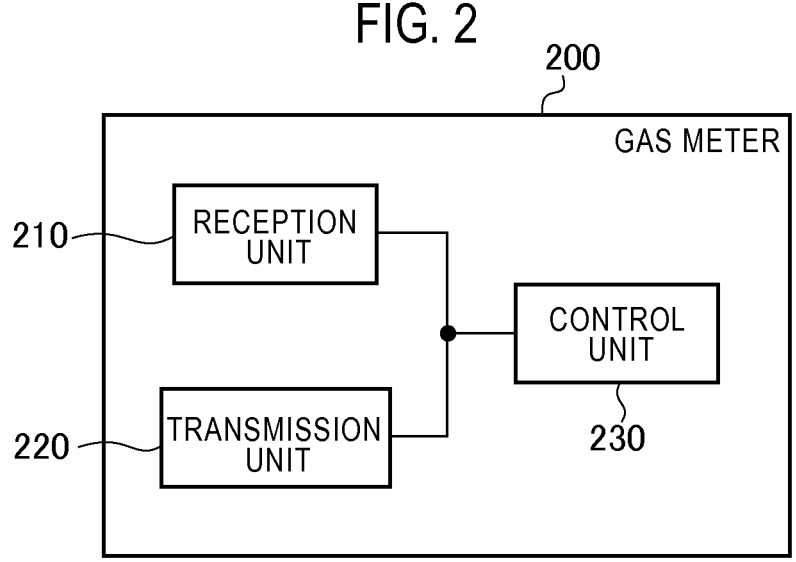
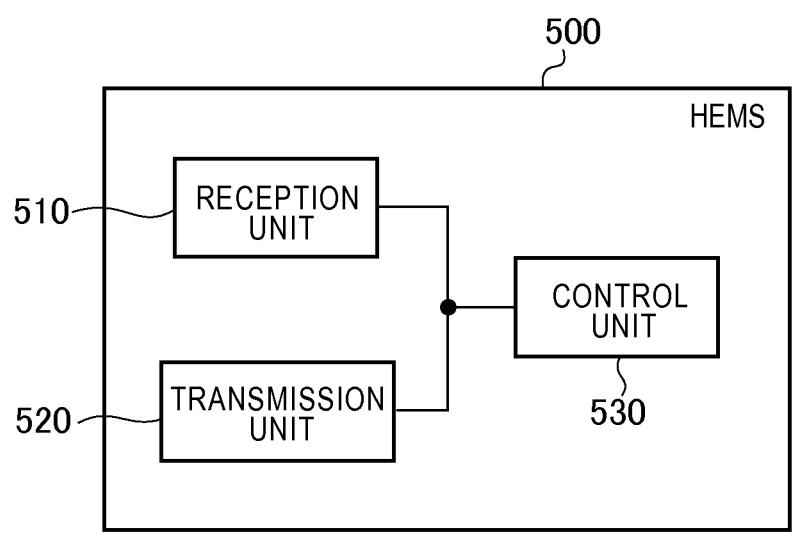

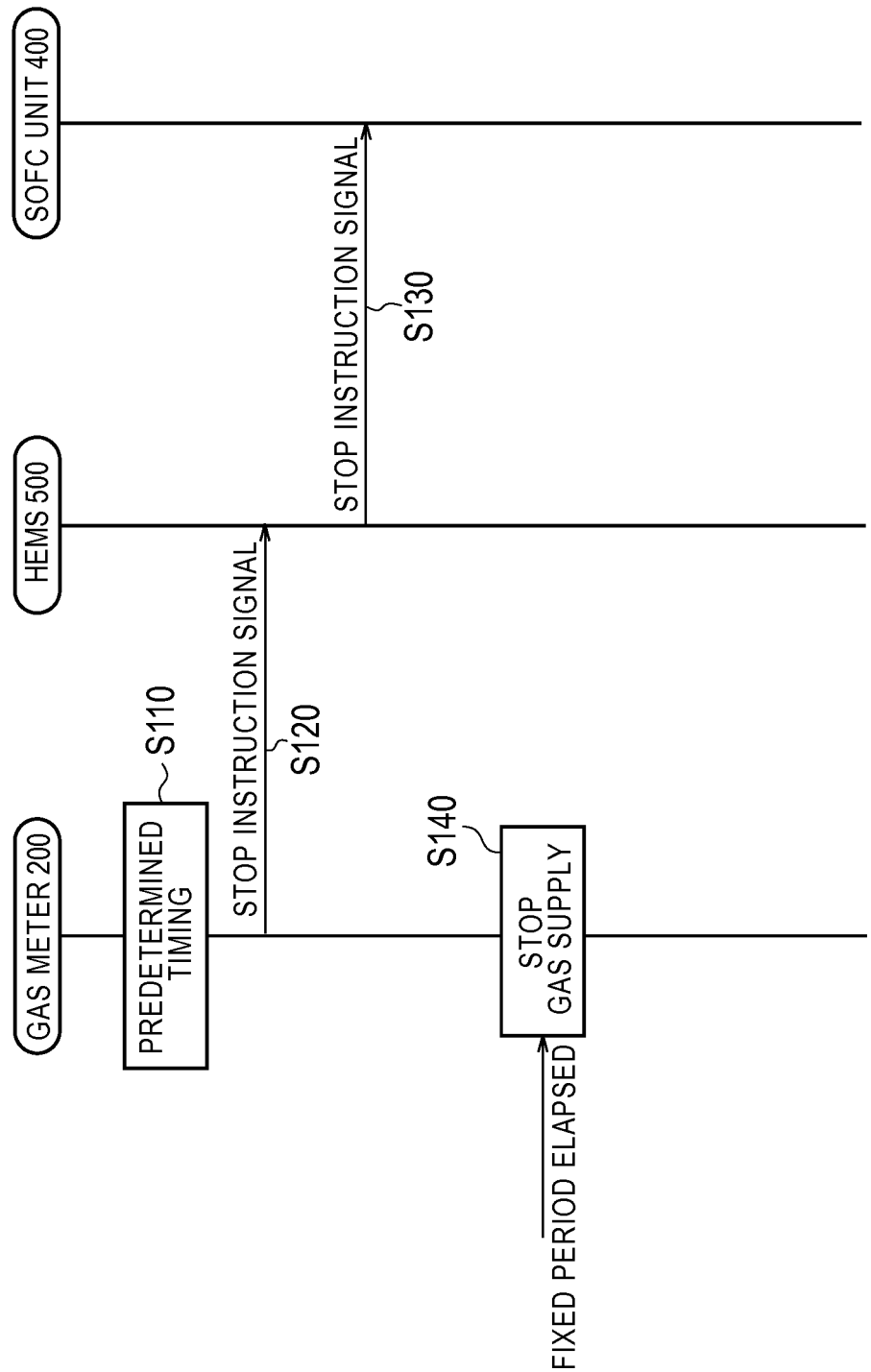

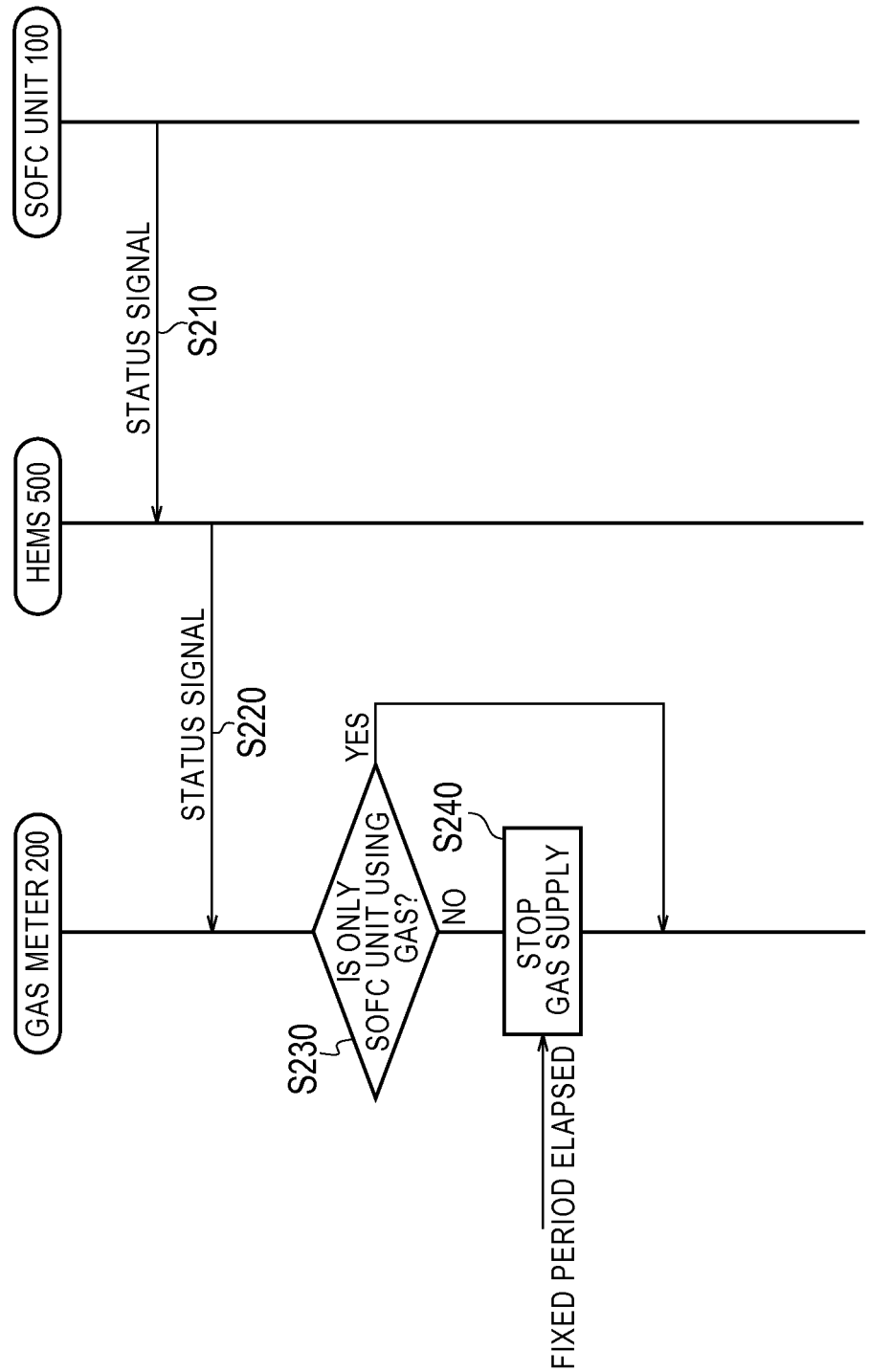

ENERGY MANAGEMENT SYSTEM, GAS METER, AND ENERGY MANAGEMENT APPARATUS

TECHNICAL FIELD

The present invention relates to an energy management system including a fuel cell unit and a gas meter, the gas meter, and an energy management apparatus.

BACKGROUND ART

In recent years, it is known a technology of controlling, for example, a load provided in a consumer or a dispersed power source provided in a consumer by an energy management apparatus (for example, HEMS: Home Energy Management System) provided in each consumer.

Examples of the dispersed power source may include a fuel cell unit including a fuel cell such as an SOFC (Solid Oxide Fuel Cell). Examples of the dispersed power source may include a power generation equipment that utilizes clean energy such as sunlight, wind power, or geothermy.

Meanwhile, a gas meter that measures the used amount of gas supplied to the consumer is provided at each consumer. The gas supplied to the consumer is used also in equipment other than the fuel cell unit (for example, a gas stove, a water heater, and floor heating).

Since the gas supplied to the consumer is never continuously used in the equipment other than the fuel cell unit, generally, gas leak is suspected when gas is continuously used.

Therefore, when gas is continuously used over a specific period or more, the gas meter has a function of stopping gas supply in order to check whether or not there is gas leak.

However, the fuel cell unit is highly likely to continuously use gas. In such a case, as described above, the gas meter stops gas supply when continuous use of gas lasts a specific period. That is, the gas supplied to the fuel cell unit may stop at an unpredictable timing. In this way, when the gas supply to the fuel cell unit stops at the unpredictable timing, decrease in output efficiency of the fuel cell unit or a failure of the fuel cell unit may occur.

CITATION LIST

Patent Literature

Patent Literature 1: Japanese examined Patent Publication No. H01-20369

SUMMARY OF THE INVENTION

An energy management system according to the first feature is provided with a fuel cell unit and a gas meter. The gas meter includes: a stop unit that stops gas supply when continuous use of gas lasts a specific period; and a transmission unit that transmits a stop instruction signal to the fuel cell unit before a timing at which continuous use of gas lasts the specific period, the stop instruction signal designating a time limit that is before the timing and instructing to stop the fuel cell unit.

In the first feature, the energy management system further comprising an energy management apparatus connected to the fuel cell unit and the gas meter. The transmission unit transmits the stop instruction signal to the fuel cell unit via the energy management apparatus.

In the first feature, the stop instruction signal includes a first stop instruction signal that designates a first time limit that is before the timing and a second stop instruction signal that designates a second time limit that is before the first time limit.

A gas meter according to the second feature is connected to a fuel cell unit. The gas meter comprises: a stop unit that stops gas supply when continuous use of gas lasts a specific period; and a transmission unit that transmits a stop instruction signal to the fuel cell unit before a timing at which continuous use of gas lasts the specific period, the stop instruction signal designating a time limit that is before the timing and instructing to stop the fuel cell unit.

An energy management apparatus according to the third feature is connected to a fuel cell unit and a gas meter. The gas meter has a function of stopping gas supply when continuous use of gas lasts a specific period. The energy management apparatus includes: a reception unit that receives a stop instruction signal from the gas meter before a timing at which continuous use of gas lasts the specific period the stop instruction signal designating a time limit that is before the timing and instructing to stop the fuel cell unit; and a transmission unit that transmits the stop signal to the fuel cell unit.

An energy management system according to the fourth feature is provided with a fuel cell unit and a gas meter. The gas meter includes: a stop unit that stops gas supply when continuous use of gas lasts a specific period; and a reception unit that receives a status signal indicating a status of the fuel cell unit, from the fuel cell unit. When it is determined that only the fuel cell unit is using gas on the basis of the status signal, the stop unit continues gas supply even when continuous use of gas lasts the specific period.

In the fourth feature, the energy management system further comprises an energy management apparatus connected to the fuel cell unit and the gas meter. The reception unit receives the status signal from the fuel cell unit via the energy management apparatus.

A gas meter according to the fifth feature is connected to a fuel cell unit. The gas meter comprises: a stop unit that stops gas supply when continuous use of gas lasts a specific period; and a reception unit that receives a status signal indicating a status of the fuel cell unit from the fuel cell unit. When it is determined that only the fuel cell unit is using gas on the basis of the status signal, the stop unit continues gas supply even when continuous use of gas lasts the specific period.

An energy management apparatus according to the sixth feature is connected to a fuel cell unit and a gas meter. The gas meter has a function of stopping gas supply when continuous use of gas lasts a specific period. The energy management apparatus includes: a reception unit that receives, from the fuel cell unit, a status signal indicating a status of the fuel cell unit; and a transmission unit that transmits the status signal to the gas meter. When it is determined that only the fuel cell unit is using gas on the basis of the status signal, the gas meter continues gas supply even when continuous use of gas lasts the specific period.

BRIEF DESCRIPTION OF THE DRAWINGS

FIG. 2 is a block diagram of the gas meter 200 according to the first feature.

FIG. 3 is a block diagram of the HEMS 500 according to the first feature.

FIG. 4 is a sequence diagram showing the energy management method according to the first feature.

FIG. 5 is a sequence diagram showing the energy management method according to the first modification.

DESCRIPTION OF THE EMBODIMENT

Figure 1:
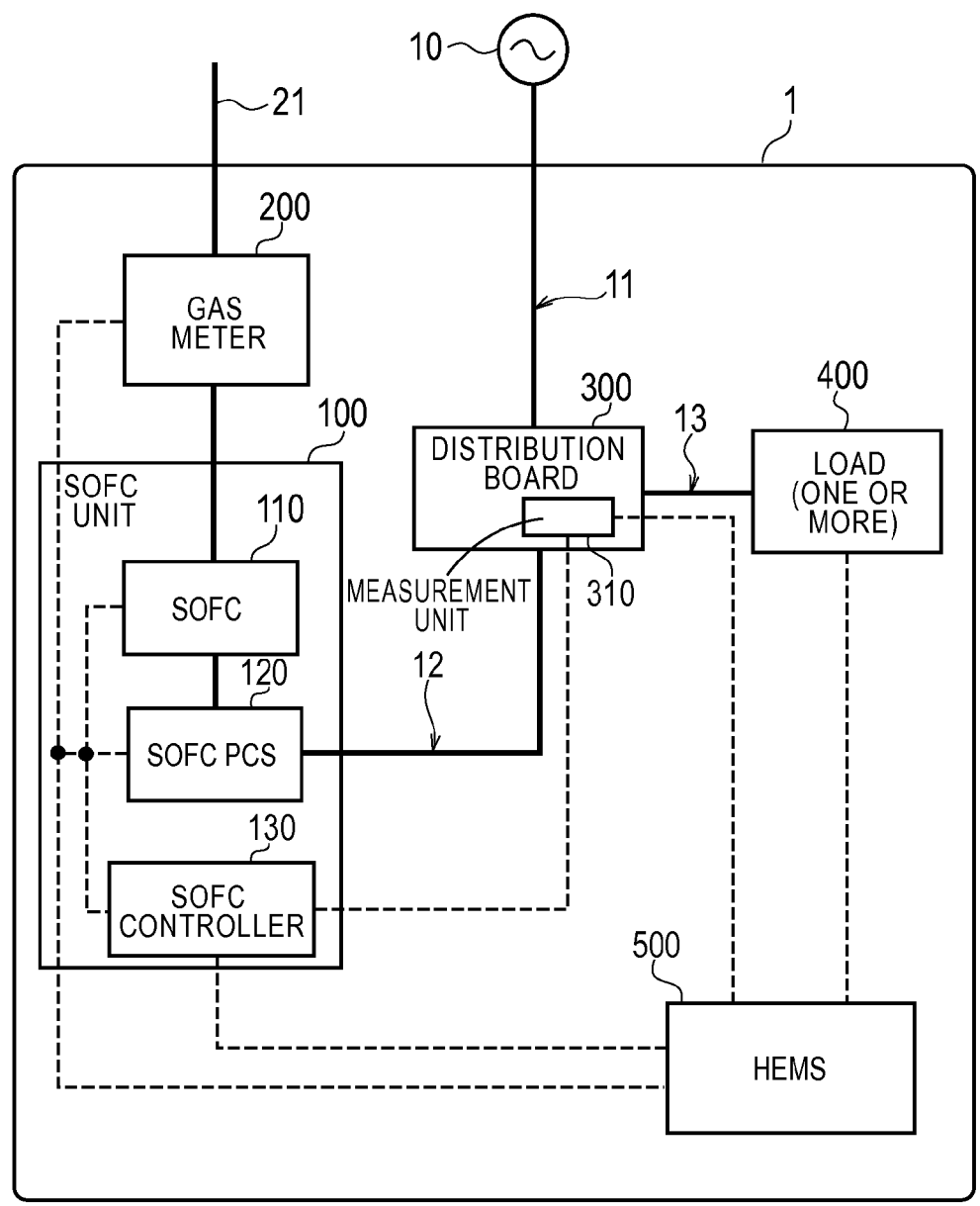
FIG. 1 is a diagram of a power management system 1 according to the first feature.

With reference to the drawings, the energy management system according to the embodiment of the present invention will be described. In the drawings of the following embodiments, the same or similar reference signs are applied to the same or similar portions.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

Summary of the Embodiment

Firstly, the energy management system is provided with a fuel cell unit and a gas meter. The gas meter includes: a stop unit that stops gas supply when continuous use of gas lasts a specific period; and a transmission unit that transmits a stop instruction signal to the fuel cell unit before a timing at which continuous use of gas lasts the specific period, the stop instruction signal designating a time limit that is before the timing and instructing to stop the fuel cell unit.

In the embodiment, the transmission unit transmits a stop instruction signal to the fuel cell unit before a timing at which continuous use of gas lasts a specific period, the stop instruction signal designating a time limit that is before the timing and instructing to stop the fuel cell unit. Therefore, that is, since stop of gas supply is notified to the fuel cell unit in advance, it is possible to prevent stop of the gas supply to the fuel cell unit at the unpredictable timing.

Secondly, the energy management system is provided with a fuel cell unit and a gas meter. The gas meter includes: a stop unit that stops gas supply when continuous use of gas lasts a specific period; and a reception unit that receives a status signal indicating a status of the fuel cell unit, from the fuel cell unit. When it is determined that only the fuel cell unit is using gas on the basis of the status signal, the stop unit continues gas supply even when continuous use of gas lasts the specific period.

In the embodiment, when it is determined that only the fuel cell unit is using gas, the stop unit continues gas supply even when continuous use of gas lasts a specific period. Therefore, it is possible to prevent stop of the gas supply to the fuel cell unit at the unpredictable timing. Further, since it is confirmed that only the fuel cell unit is using gas, it is also possible to detect a failure such as gas leak.

First Embodiment (Energy Management System)

Hereinafter, an energy management system according to a first embodiment will be described. FIG. 1 is a diagram of a power management system 1 according to the first embodiment.

As shown in FIG. 1, the power management system 1 includes an SOFC unit 100, a gas meter 200, a distribution board 300, a load 400, and an HEMS 500.

The SOFC unit 100 is a unit including equipment (Solid Oxide Fuel Cell) that outputs power (for example, DC power) by a chemical reaction between hydrogen extracted from natural gas, for example, and oxygen in the air. The SOFC unit 100 is an example of a fuel cell unit.

In particular, the SOFC unit 100 includes an SOFC 110, an SOFC PCS 120, and an SOFC controller 130.

The SOFC 110 is equipment (Solid Oxide Fuel Cell) that generates power (for example, DC power) by a chemical reaction between hydrogen extracted from gas, etc., and oxygen in the air. The SOFC 110 is an example of the fuel cell. An amount of power generated by the SOFC 110 varies depending on an amount of gas and air supplied to the SOFC 110. The amount of gas and air is controlled by the SOFC 130. The SOFC PCS 120 converts the DC power output from the SOFC 110 into AC power. The SOFC PCS 120 outputs the AC power to the distribution board 300 via a power line 12.

The SOFC controller 130 performs control for performing a load following operation. Specifically, the SOFC controller 130 controls the SOFC 110 so that the power output from the SOFC unit 100 (SOFC 110) follows the power consumption of the load 400.

The SOFC controller 130 decides a target output power value of the SOFC unit 100 (SOFC 110) so that the power supplied from a grid 10 reaches a predetermined value (for example, zero). The SOFC controller 130 controls the SOFC 110 so that the power output from the SOFC unit 100 (SOFC 110) reaches a target output power value.

The power supplied from the grid 10 varies depending on the power consumption of the load 400. Therefore, it should be noted that even in a case of deciding the target output power value according to the power supplied from the grid 10, the power output from the SOFC unit 100 (SOFC 110) follows the power consumption of the load 400.

Alternatively, the SOFC controller 130 decides the target output power value equal to the power consumption of the load 400. The SOFC controller 130 controls the SOFC 110 so that the power output from the SOFC unit 100 (SOFC 110) reaches a target output power value.

The gas meter 200 is connected to the SOFC 110 via a gas line 21 and measures the amount of gas supplied to the SOFC 110. Although it is not shown in FIG. 1, the gas meter 200 may be connected to equipment other than the SOFC 110 (for example, a gas stove, a water heater, and floor heating) via the gas line 21. In such a case, the gas meter 200 also measures the amount of gas supplied to the equipment other than the SOFC 110.

In this case, the gas meter 200 has a function of stopping gas supply when the continuous use of gas lasts a specific period. Further, the gas meter 200 is connected to the SOFC unit 100 and the HEMS 500 via a signal line. The gas meter 200 will be described in detail later (see FIG. 2).

The distribution board 300 is connected to the grid 10 via a power line 11, connected to the SOFC unit 100 via a power line 12, and connected to the load 400 via a power line 13. The distribution board 300 distributes the power supplied from the grid 10 via the power line 11 and the power supplied from the SOFC unit 100 via the power line 12, to the load 400 via the power line 13.

In the first embodiment, the distribution board 300 includes the measurement unit 310. The measurement unit 310 measures the power supplied from the grid 10. In addition, the measurement unit 310 measures the power consumption of the load 400.

When there are provided a plurality of loads 400, a measurement unit may measure a sum of power consumption of the loads 400, or may individually measure power consumption of each load 400.

In this case, the measurement unit 310 is connected to the SOFC unit 100 and the HEMS 500 via a signal line, and transmits a measured value to the SOFC unit 100 and the HEMS 500.

The load 400 is equipment that consumes the power supplied via the power line 13. Examples of the load 400 include equipment such as a refrigerator, lighting, an air conditioner, and TV. The load 400 may be single equipment, and may include a plurality of equipment.

The HEMS 500 is an apparatus (HEMS: Home Energy Management System) that manages the power of the consumer. The HEMS 500 is connected to the SOFC unit 100, the gas meter 200, the distribution board 300 (measurement unit 310), and the load 400 via a signal line. The HEMS 500 may include a function of controlling an operation mode of the load 400. The HEMS 500 is an example of a power management apparatus. The HEMS 500 will be described in detail later (see FIG. 3).

(Gas Meter)

A gas meter according to the first embodiment will be described below. FIG. 2 is a diagram showing the gas meter 200 according to the first embodiment.

As shown in FIG. 2, the gas meter 200 has a reception unit 210, a transmission unit 220, and a control unit 230.

The reception unit 210 receives various types of information from the SOFC unit 100 and the HEMS 500. The transmission unit 220 transmits the various types of information to the SOFC unit 100 and the HEMS 500.

For example, the transmission unit 220 transmits a stop instruction signal before a timing (hereinafter, a stop timing) at which continuous use of gas lasts a specific period (for example, 27 days), the stop instruction signal designating a time limit that is before the stop timing and instructing to stop the SOFC unit 100.

In this case, the transmission unit 220 transmits the stop instruction signal to the SOFC unit 100 via the HEMS 500. However, the transmission unit 220 may transmit the stop instruction signal to the SOFC unit 100, not via the HEMS 500.

It should be noted that the SOFC unit 100 stops the SOFC 110 before the time limit designated by the stop instruction signal.

The control unit 230 controls the gas meter 200. Firstly, the control unit 230 constitutes the stop unit that stops gas supply when continuous use of gas lasts a specific period. The control unit 230 has a timer for counting a period of continuous use of gas, and the like.

Secondly, the control unit 230 instructs the transmission unit 220 to transmit a stop instruction signal before the stop timing, the stop instruction signal designating the time limit that is before the stop timing and instructing to stop the SOFC unit 100.

In this case, the stop instruction signal may include a plurality of stop instruction signals that determine a time limit by which the SOFC unit 100 should be stopped in a stepwise manner. For example, the stop instruction signals include (a) a signal that designates a time limit that is five days before the stop timing, (b) a signal that designates a time limit that is one day before the stop timing, (c) a signal instructing to stop immediately as a normal stop process, and (d) a signal instructing to stop immediately as emergency stop.

Generally, it takes about one day to stop the SOFC unit 100. Therefore, it may be considered that the stop instruction signals (b) and (c) are the same signals. Further, the time limit designated by the stop instruction signal may be a time limit by which a stop process of the SOFC unit 100 should be started or a time limit by which the stop process of the SOFC unit 100 should be completed.

In the first embodiment, the control unit 230 manages a schedule of the power consumption of the load 400, and it is preferable to instruct the transmission unit 220 to transmit the stop instruction signal at a timing when the power consumption of the load 400 is lower than a predetermined threshold value.

(Energy Management Apparatus)

Hereinafter, an energy management apparatus according to the first embodiment will be described. FIG. 3 is a diagram showing the HEMS 500 according to the first embodiment. As shown in FIG. 3, the HEMS 500 includes a reception unit 510, a transmission unit 520, and a control unit 530.

The reception unit 510 receives various types of information from the gas meter 200, the distribution board 300 (the measurement unit 310), and the load 400. In particular, the reception unit 510 receives the stop instruction signal from the gas meter 200.

The reception unit 510 may receive, from the measurement unit 310, power (measured value) supplied from the grid 10 or the power consumption (measured value) of the load 400. Further, the reception unit 510 may receive, from the load 400, load state information indicating a state (power ON/OFF, an operation mode) of the load 400.

The transmission unit 520 transmits various types of information to the SOFC unit 100 and the load 400. In particular, the transmission unit 520 transmits, to the SOFC unit 100, the stop instruction signal received from the gas meter 200.

The transmission unit 520 may transmit, to the load 400, load control information for controlling the load 400.

The control unit 530 controls the HEMS 500. In particular, when receiving the stop instruction signal received from the gas meter 200, the control unit 530 instructs the transmission unit 520 to transmit the stop instruction signal.

The control unit 530 may instruct the transmission unit 520 to transmit the load control information for controlling the load 400 on the basis of various types of information such as load state information.

(Energy Management Method)

Hereinafter, an energy management method according to the first embodiment will be described. FIG. 4 is a sequence diagram showing the energy management method according to the first embodiment.

As shown in FIG. 4, in step 110, the gas meter 200 detects a predetermined timing that is before a timing (stop timing) at which continuous use of gas lasts a specific period (for example, 27 days).

In step 120, the gas meter 200 transmits a stop instruction signal to the HEMS 500, the stop instruction signal designating a time limit that is before the stop timing and instructing to stop the SOFC unit 100.

In step 130, the HEMS 500 transmits, to the SOFC unit 100, the stop instruction signal received from the gas meter 200.

It should be noted that the SOFC unit 100 stops the SOFC 110 before the time limit designated by the stop instruction signal.

In step 140, the gas meter 200 detects the stop timing and stops gas supply to the SOFC unit 100 (the SOFC 110). The gas meter 200 also stops gas supply to equipment other than the SOFC 110 (for example, a gas stove, a water heater, and floor heating).

(Operation and Effect)

In the first embodiment, the gas meter 200 transmits a stop instruction signal to the SOFC unit 100 before a timing at which continuous use of gas lasts a specific period, the stop instruction signal designating a time limit that is before the timing and instructing to stop the SOFC unit 100. Therefore, since stop of gas supply is notified to the SOFC unit 100 in advance, it is possible to prevent stop of the gas supply to the SOFC unit 100 at the unpredictable timing.

First Modification

Hereinafter, a first modification of the first embodiment will be described. Mainly differences from the first embodiment will be described below.

In the first modification, the gas meter 200 receives a status signal indicating a status of the SOFC unit 100 from the SOFC unit 100, and when it is determined that only the SOFC unit 100 (the SOFC 110) is using gas on the basis of the status signal, the gas meter 200 continues gas supply even when continuous use of gas lasts a specific period.

In the first modification, it should be noted that the above-described reception unit 210 receives the status signal indicating a status of the SOFC unit 100. The reception unit 210 receives the status signal from the SOFC unit 100 via the HEMS 500. However, the reception unit 210 may receive the status signal from the SOFC unit 100, not via the HEMS 500.

In this case, the status signal includes an operation state of the SOFC 110, the flow rate of gas supplied to the SOFC 110, a gas pressure used in the SOFC 110, the amount of gas used in the SOFC 110, and the like. It is sufficient if the status signal includes information necessary for comparing with a gas supply amount that can be measured by the gas meter 200.

Further, in the first modification, when it is determined that only the SOFC unit 100 (the SOFC 110) is using gas, the above-described control unit 230 continues gas supply even when continuous use of gas lasts a specific period.

(Energy Management Method)

Hereinafter, an energy management method according to the first modification will be described. FIG. 5 is a sequence diagram showing the energy management method according to the first modification.

As shown in FIG. 5, in step 210, the SOFC unit 100 transmits, to the HEMS 500, the status signal indicating a status of the SOFC unit 100.

In step 220, the HEMS 500 transmits, to the gas meter 200, the status signal received from the SOFC unit 100.

In step 230, the gas meter 200 determines whether or not only the SOFC unit 100 (the SOFC 110) is using gas on the basis of the status signal. The gas meter 200 completes a series of processes, when a determination result is "YES". That is, the gas meter 200 continues gas supply even when continuous use of gas lasts a specific period. Further, the gas meter 200 resets the timer for counting a period of continuous use of gas. Meanwhile, the gas meter 200 proceeds to a process in step 240 when the determination result is "NO".

In step 240, the gas meter 200 detects the stop timing and stops gas supply to the SOFC unit 100 (the SOFC 110). The gas meter 200 also stops gas supply to equipment other than the SOFC 110 (for example, a gas stove, a water heater, and floor heating).

(Operation and Effect)

In the first modification, when it is determined that only the SOFC unit 100 is using gas, the gas meter 200 continues gas supply even when continuous use of gas lasts a specific period. Therefore, it is possible to prevent stop of the gas supply to the SOFC unit 100 at the unpredictable timing. Further, since it is confirmed that only the SOFC unit 100 is using gas, it is also possible to detect a failure such as gas leak.

Other Embodiments

As described above, the present invention has been described according to the embodiment. It must not be understood that, however, the discussions and the drawings constituting a part of this disclosure limit the present invention. From this disclosure, various alternative embodiments, examples and operational techniques will be apparent to those skilled in the art.

In the embodiment, as the energy management apparatus, the HEMS 500 is described as an example. However, the energy management apparatus may be a BEMS (Building and Energy Management System) or an FEMS (Factory Energy Management System), for example.

In the embodiment, communication between the SOFC unit 100 and the gas meter 200 is performed via the HEMS 500. However, the embodiment is not limited thereto. Specifically, the communication between the SOFC unit 100 and the gas meter 200 may be directly performed, not via the HEMS 500.

Although not particularly described in the embodiment, communication in a network configured by the HEMS 500 and each equipment (the SOFC unit 100, the gas meter 200, the distribution board 300, and the load 400) is preferably performed in compliance with a predetermined protocol (ECHONET Lite, ZigBEE SEP2.0, KNX, etc.). In such a case, between the HEMS 500 and each equipment (the SOFC unit 100, the gas meter 200, the distribution board 300, and the load 400), various types of commands are communicated in a format defined in a predetermined protocol. For example, a stop instruction signal notified by the gas meter 200 or the HEMS 500 to the SOFC unit 100, a status signal notified by the SOFC unit 100 to the gas meter 200 or the HEMS 500, a status signal notified by the HEMS 500 to the gas meter 200, the load state information (power ON/OFF, operation mode) notified by the load 400 to the HEMS 500, and operation mode designation information (information for designating an operation mode of the load 400) notified by the HEMS 500 to the load 400 are notified in a format defined in a predetermined protocol.

Note that the entire content of the Japanese Patent Application No. 2011-213582 (filed on Sep. 28, 2011) is incorporated herein by reference.

INDUSTRIAL APPLICABILITY

According to the present invention, it is possible to provide an energy management system, gas meter, and energy management apparatus, with which it is possible to restrain stop of the gas supply to the fuel cell unit at the unpredictable timing.

The invention claimed is:

1. An energy management system comprising:
 a fuel cell apparatus configured to generate power using a gas;
 a gas meter configured to measure the gas supply to at least the fuel cell apparatus; and
 a controller configured to control the gas meter, wherein
   the controller is configured to stop gas supply to at least the fuel cell apparatus when continuous use of gas lasts a specific time period; and to transmit a stop instruction signal to the fuel cell apparatus prior to expiry of the specific time period, whereby the fuel cell apparatus stops prior to stopping of gas supply to the fuel cell apparatus.

2. The energy management system according to claim 1, comprising:
an energy management apparatus connected to the fuel cell apparatus and the gas meter, wherein
the controller is configured to transmit the stop instruction signal to the fuel cell apparatus via the energy management apparatus.

3. The energy management system according to claim 1, wherein
the stop instruction signal includes a first stop instruction signal that designates a first time limit that is before the expiry of the specific time period and a second stop instruction signal that designates a second time limit that is before the first time limit.

4. A gas meter connected to a fuel cell apparatus, comprising:
a controller configured to stop gas supply to at least the fuel cell apparatus when continuous use of gas lasts a specific time period; and
a transmission unit configured to transmit a stop instruction signal to the fuel cell apparatus prior to expiry of the specific time period, whereby the fuel cell apparatus stops prior to stopping of the gas supply to the fuel cell apparatus.

5. An energy management apparatus connected to a fuel cell apparatus and a gas meter, wherein
the gas meter has a function of stopping gas supply to at least the fuel cell apparatus when continuous use of gas lasts a specific time period, and
the energy management apparatus includes:
a reception unit that receives a stop instruction signal from the gas meter prior to expiry of the specific time period, and
a transmission unit configured to transmit the stop instruction signal to the fuel cell apparatus, whereby the fuel cell apparatus stops prior to stopping of the gas supply to the fuel cell apparatus.

6. An energy management system comprising:
a fuel cell apparatus configured to generate power using a gas;
a gas meter configured to measure the gas supplied to at least the fuel cell apparatus; and
a controller configured to control the gas meter, wherein the controller is configured to:
stop gas supply to at least the fuel cell apparatus when continuous use of gas lasts a specific time period;
receive a fuel cell status signal from the fuel cell apparatus indicating a status of the fuel cell apparatus, and
to continue gas supply to the fuel cell apparatus even when the continuous use of gas lasts the specific time period when the controller determines that only the fuel cell apparatus is using gas on the basis of the fuel cell status signal.

7. The energy management system according to claim 6, further comprising:
an energy management apparatus connected to the fuel cell apparatus and the gas meter, wherein
the controller receives the fuel cell status signal from the fuel cell apparatus via the energy management apparatus.

8. A gas meter connected to a fuel cell apparatus, comprising:
a controller configured to stop gas supply to the fuel cell apparatus when continuous use of gas lasts a specific time period; and
a reception unit configured to receive a fuel cell status signal indicating a status of the fuel cell apparatus from the fuel cell apparatus, wherein
the controller is configured to continue gas supply to the fuel cell apparatus even when continuous use of gas lasts the specific time period when the controller determines that only the fuel cell apparatus is using gas on the basis of the fuel cell status signal.

9. An energy management apparatus connected to a fuel cell apparatus and a gas meter, wherein
the gas meter has a function of stopping gas supply when continuous use of gas lasts a specific time period,
the energy management apparatus includes:
a reception unit configured to receive a fuel cell status signal from the fuel cell apparatus indicating a status of the fuel cell apparatus;
a transmission unit configured to transmit the fuel cell status signal to the gas meter, and
a controller,
wherein the gas meter is configured to continue gas supply to the fuel cell apparatus even when the continuous use of gas lasts the specific time period if the controller determines that only the fuel cell apparatus is using gas on the basis of the fuel cell status signal.

* * * * *